(12) United States Patent
Mantese et al.

(10) Patent No.: US 7,575,826 B2
(45) Date of Patent: *Aug. 18, 2009

(54) FUEL CELL WITH METAL ALLOY CONTACTS THAT FORM PASSIVATING CONDUCTIVE OXIDE SURFACES

(75) Inventors: Joseph V. Mantese, Shelby Township, MI (US); David S. Eddy, Washington, MI (US); Neil R. Aukland, Sterling Heights, MI (US); Margarita P. Thompson, Livonia, MI (US); Su-Chee S. Wang, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/825,037

(22) Filed: Jul. 3, 2007

(65) Prior Publication Data

US 2007/0254194 A1    Nov. 1, 2007

Related U.S. Application Data

(63) Continuation of application No. 10/674,245, filed on Sep. 29, 2003, now abandoned, which is a continuation-in-part of application No. 10/224,871, filed on Aug. 21, 2002, now Pat. No. 7,037,617.

(51) Int. Cl.
*H01M 8/10*    (2006.01)
(52) U.S. Cl. .............................. 429/30; 429/12; 429/34; 429/44
(58) Field of Classification Search .................. 429/30, 429/12, 34, 44
See application file for complete search history.

(56) References Cited

U.S. PATENT DOCUMENTS 3,235,476 A * 2/1966 Boyd et al. ............ 204/192.25

(Continued)

FOREIGN PATENT DOCUMENTS

JP    60224812    11/1985

(Continued)

OTHER PUBLICATIONS

Search Report, European Patent Office, Mar. 20, 2006, Application No. EP 06075101.3, Munich, Germany.

(Continued)

*Primary Examiner*—Laura S Weiner
(74) *Attorney, Agent, or Firm*—Paul L. Marshall

(57) ABSTRACT

A metal alloy which when oxidized forms a highly conductive surface oxide layer. Alloy compositions such as, but not limited to, Ti—Nb, Ti—Ta, La—Sr—Cr, and La—Sr—Co are known to form oxide passivation layers which are highly conductive. Such alloys are useful in electrical contact apparatus. An electrical contact element formed of the alloy has a contact surface which when oxidized forms a highly conductive surface layer, thus maintaining electrical conductivity and continuity through the element. The oxide layer may be formed in situ after assembly of the electrical contact or may be provided in an oxidative step during manufacture. The electrical contact may be formed entirely of one or more of such alloys; or may be formed of an inexpensive substrate base metal, such as steel, having one or more of the alloys coated thereupon; or may be formed of a mixture of the base metal and the alloy.

21 Claims, 4 Drawing Sheets

U.S. PATENT DOCUMENTS

| | | | |
|---|---|---|---|
| 3,671,226 | A | 6/1972 | Komata et al. |
| 4,468,416 | A | 8/1984 | Asano et al. |
| 5,441,670 | A | 8/1995 | Shimamune et al. |
| 5,942,349 | A * | 8/1999 | Badwal et al. ............ 429/34 |
| 6,280,868 | B1 * | 8/2001 | Badwal et al. ............ 429/34 |
| 6,321,145 | B1 | 11/2001 | Rajashekara |
| 6,346,182 | B1 | 2/2002 | Bradley |
| 6,423,896 | B1 | 7/2002 | Keegan |
| 6,455,185 | B2 | 9/2002 | Bircann et al. |
| 6,485,852 | B1 | 11/2002 | Miller et al. |
| 6,509,113 | B2 | 1/2003 | Keegan |
| 6,551,734 | B1 | 4/2003 | Simpkins et al. |
| 6,562,496 | B2 | 5/2003 | Faville et al. |
| 6,608,463 | B1 | 8/2003 | Kelly et al. |
| 6,613,468 | B2 | 9/2003 | Simpkins et al. |
| 6,613,469 | B2 | 9/2003 | Keegan |
| 6,620,541 | B2 * | 9/2003 | Fleck et al. ............ 429/34 |
| 6,627,339 | B2 | 9/2003 | Haltiner, Jr. |
| 6,630,264 | B2 | 10/2003 | Haltiner, Jr. et al. |
| 6,805,989 | B2 | 10/2004 | Seido et al. |
| 6,843,960 | B2 | 1/2005 | Krumpelt et al. |
| 6,963,117 | B2 | 11/2005 | Yang et al. |
| 7,037,617 | B2 * | 5/2006 | Eddy et al. ............ 429/34 |
| 2004/0058205 | A1 | 3/2004 | Mantese et al. |
| 2004/0247978 | A1 | 12/2004 | Shimamune |
| 2005/0189041 | A1 | 9/2005 | Mantese et al. |
| 2006/0222927 | A1 | 10/2006 | Eddy et al. |

FOREIGN PATENT DOCUMENTS

JP            07073871            3/1995

OTHER PUBLICATIONS

Non-Final Office Action, US Patent and Trademark Office, Mailed Mar. 5, 2009, U.S. Appl. No. 11/039,579, Alexandria, VA, US.

Restriction Requirement, US Patent and Trademark Office, Mailed Sep. 21, 2007, U.S. Appl. No. 11/039,579, Alexandria, VA, US.

Non-Final Office Action, US Patent and Trademark Office, Mailed Jan. 10, 2008, U.S. Appl. No. 11/039,579, Alexandria, VA, US.

U.S. Patent and Trademark Office, Notice of Non-Compliant Amendment, Mailed May 14, 2008, U.S. Appl. No. 11/039,579, Alexandria, VA, US Final Office Action, US Patent and Trademark Office, Mailed Sep. 3, 2008, U.S. Appl. No. 11/039,579, Alexandria, VA, US.

Advisory Action, US Patent and Trademark Office, Mailed Oct. 7, 2008, U.S. Appl. No. 11/039,579, Alexandria, VA, US.

Non-Final Office Action, US Patent and Trademark Office, Mailed Sep. 27, 2004, U.S. Appl. No. 10/224,871, Alexandria, VA, US.

Non-Final Office Action, US Patent and Trademark Office, Mailed Mar. 15, 2005, U.S. Appl. No. 10/244,871, Alexandria, VA, US.

Final Office Action, US Patent and Trademark Office, Mailed Aug. 1, 2005, U.S. Appl. No. 10/224,871, Alexandria, VA, US.

Advisory Action, US Patent and Trademark Office, Mailed Oct. 24, 2005, U.S. Appl. No. 10/224,871, Alexandria, VA, US.

Notice of Allowance and Fees Due, etc., US Patent and Trademark Office, Mailed Dec. 29, 2005, U.S. Appl. No. 10/224,871, Alexandria, VA, US.

Non-Final Office Action, US Patent and Trademark Office, Mailed Nov. 26, 2008, U.S. Appl. No. 11/386,930, Alexandria, VA, US.

Restriction Requirement, US Patent and Trademark Office, Mailed Mar. 24, 2006, U.S. Appl. No. 10/674,245, Alexandria, VA, US.

Restriction Requirement, US Patent and Trademark Office, Mailed Jun. 22, 2006, U.S. Appl. No. 10/674,245, Alexandria, VA, US.

Non-Final Office Action, US Patent and Trademark Office, Mailed Oct. 4, 2006, U.S. Appl. No. 10/674,245, Alexandria, VA, US.

Final Office Action, US Patent and Trademark Office, Mailed Mar. 29, 2007, U.S. Appl. No. 10/674,245, Alexandria, VA, US.

* cited by examiner

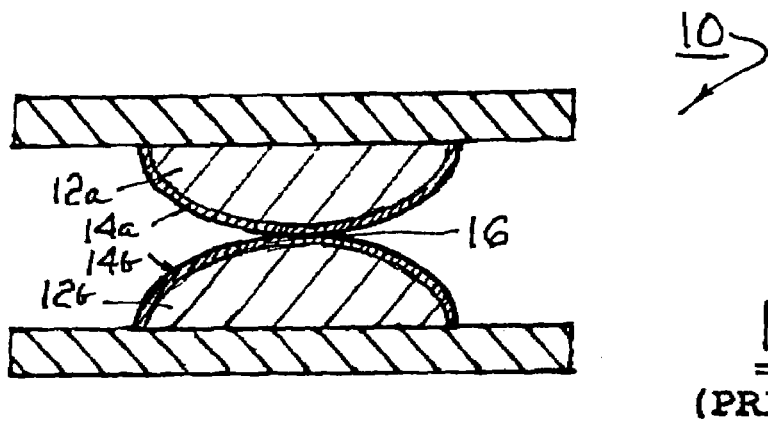
FIG. 1
(PRIOR ART)
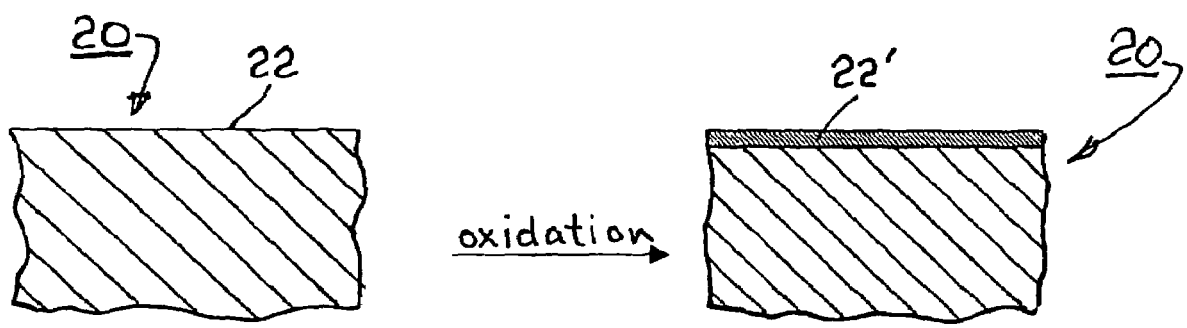
FIG. 2a
FIG. 2b

FUEL CELL WITH METAL ALLOY CONTACTS THAT FORM PASSIVATING CONDUCTIVE OXIDE SURFACES

RELATIONSHIP TO OTHER APPLICATIONS AND PATENTS

The present application is a continuation of U.S. patent application Ser. No. 10/674,245, filed Sep. 29, 2003 now abandoned, which is a continuation-in-part of U.S. patent application Ser. No. 10/224,871, filed Aug. 21, 2002 now U.S. Pat. No. 7,037,617.

TECHNICAL FIELD

The present invention relates to conductive materials; more particularly, to such materials useful in forming high-conductivity, durable electrical contacts; and most particularly, to such materials which are not noble metals and which form passivating yet conductive surface oxides.

BACKGROUND OF THE INVENTION

In devices having contact surfaces for conducting electricity between two elements equipped with such contact surfaces (referred to herein as "electrical contacts"), an electrical continuity problem is well known in the art. As used herein, "electrical contact" should be taken to mean any surface which electrical current enters or exits, or apparatus having such a surface. Examples of such an apparatus are batteries, lamps, sliding switches as in a battery-powered flashlight, electrical relays, header connectors, circuit board terminals, computer peripheral back planes, and both solid-oxide and proton exchange membrane fuel cell assemblies. Inexpensive base metals typically used to form prior art electrical contacts, for example, aluminum, zinc, copper, tin, or stainless steel, either corrode or form electrically-resistive oxide layers on the surface of the contacts because of electrochemical activity and/or atmospheric attack at these surfaces. The non-conductive oxide surface layers increase the resistance of the metallic interface and inversely decrease the conductivity. Practical conduction of a surface in any application depends, of course, on the applied voltage and amperage; but for many applications, for example, in fuel cell assemblies, a measured resistance of greater than about 0.0015 ohmcm$^2$ ($\Omega$cm$^2$) is unacceptable. In the prior art, electrical contacts requiring high conductivity and long durability are known to be coated with noble metals such as gold and platinum to prevent corrosion of the electrical contact surfaces, but such coatings are so expensive as to be impractical for many ordinary applications.

One example pertains to the electric contact resistance of hydrogen/oxygen fuel cells, wherein such considerations are especially relevant. In a proton exchange membrane (PEM) fuel cell stack, individual membrane electrode assemblies (MEA) are connected in electrical series using "bipolar plates" between the MEAs. The functions of each bipolar plate include connecting the individual fuel cells, distributing fuel gas over the anode surface, distributing oxygen over the cathode surface, and conducting current from the anode of one cell to the cathode of the next. Bipolar plates are typically formed of graphite or carbon-based composites which are conductive and have low density. Graphite, however, is brittle and has relatively low strength, making it difficult to handle. In addition, it is bulky, is expensive to machine, and is relatively porous. Metals are better electrical conductors than graphite, are more compact, are relatively easy to machine, and are usually not porous. However, the PEM fuel cell environment is very corrosive for all prior art materials but the noble metals, as water vapor, oxygen, and heat coexist in a PEM fuel cell. Furthermore, during long-term operation of a PEM fuel cell, small amounts of HF and $H_2SO_4$ are known to leach out of other components, leading to either pitting corrosion or formation of a high-resistance passivating layer on the cathode side of a metal bipolar plate. In the prior art, only conductive polymer or noble metal coatings are satisfactory solutions to this problem for metal bipolar plates, and each is expensive and requires an additional manufacturing step, which increases the overall cost of a PEM fuel cell.

Another example occurs in the electrical contacts formed in standard connectors having terminals formed of non-noble metals. Typically, the point of electrical contact inside a connector is a dimpled metallic surface pressed against another metallic surface, which may be flat or contoured. After the connector is assembled, the measured resistance across the connection interface is desirably less than 10 m$\Omega$ or $0.2 \times 10^{-4}$ m$\Omega$cm$^2$. Unfortunately, this initial value may change over time, because the metallic surfaces can oxidize, causing the measured resistance across the metallic interface to increase.

Copper, tin, silver, palladium, and hardened gold are all commonly used connector interface materials. Hardened gold provides the most reliable and stable interconnection, but even this material will degrade to a failure level due either to diffusion of an additive (cobalt or nickel) that hardens the gold to the surface or to wear-through of the gold layer and exposure of the more reactive base metal, typically a copper alloy. In all cases, the electrical interconnection will eventually fail.

What is needed is a simple and cost-effective means for providing and maintaining electrical conductivity of electrical contact surfaces in environments which produce high-resistance passivating or corrosion layers on base metal contact surfaces.

It is a principal object of the present invention to provide improved materials for forming or surface coating electrical contacts which are simple and inexpensive to manufacture and which maintain acceptable electrical conductivity of the surface during use.

It is a further object of the invention to increase the durability and reliability of electrical contacts and of apparatus equipped with electrical contacts.

It is a further object of the invention to reduce the manufacturing cost of apparatus incorporating electrical contact surfaces.

SUMMARY OF THE INVENTION

Briefly described, electrical contacts and/or contact surfaces are formed of metal alloys which when oxidized form highly conductive and passivating oxide layers, thus maintaining electrical conductivity and continuity. In accordance with the invention, alloy composition systems such as, but not limited to, Ti—Nb, Ti—Ta, La—Sr—Cr, La—Sr—Co, Cu—Ti, Cu—Fe, Cu—Mn, and Sn—In form surface oxide passivation layers which are highly conductive. The conductive layers may be formed in situ after assembly of the electrical contacts or may be provided in an oxidative step during manufacture. The electrical contacts may be formed entirely of one or more of such alloys, or may be formed of an inexpensive base metal having the alloy coated thereupon, or the alloy may form a homogeneous mixture throughout the electrical contact, the alloy portion exposed at the contact surface forming a conductive oxide layer.

BRIEF DESCRIPTION OF THE DRAWINGS

The present invention will now be described, by way of example, with reference to the accompanying drawings, in which:

FIG. 1 is a schematic cross-sectional view of a prior art apparatus having mating first and second electrical contacts;

FIGS. 2a and 2b are schematic cross-sectional views of a metal alloy in accordance with the invention without and with, respectively, conductive metal oxide surface layers formed either naturally or as induced by a processing step;

DESCRIPTION OF THE PREFERRED EMBODIMENTS

Figure 3:
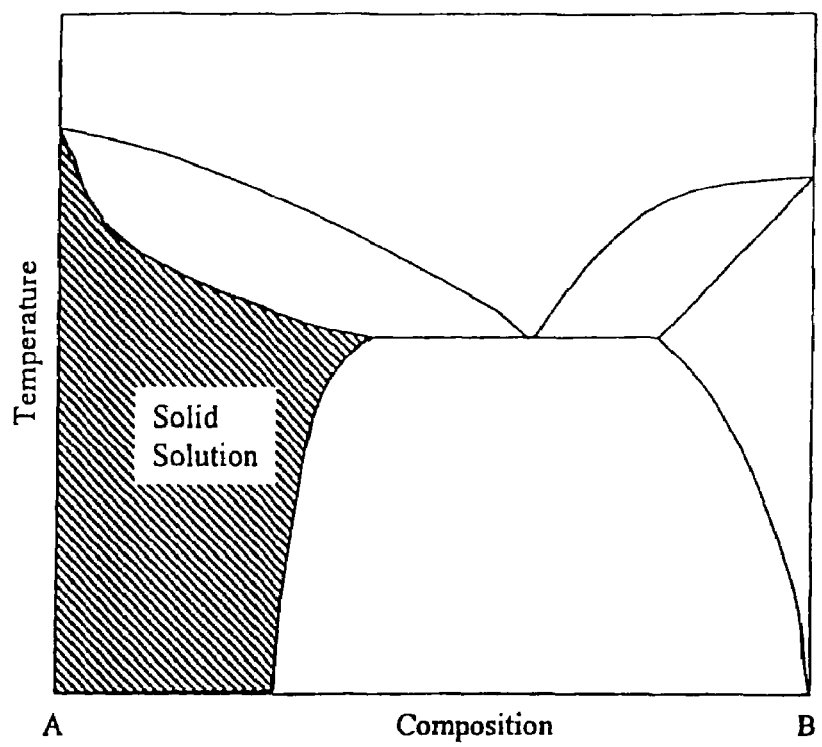
FIG. 3 is a schematic phase diagram of a binary alloy (although ternary and quaternary and higher order phase diagrams may equally apply) showing a region wherein a solid solution of metals exists.

Referring to FIG. 1, a prior art electromechanical apparatus 10 includes a first electrical contact element 12a and a second electrical contact element 12b, shown in mechanical and electrical contact along respective surfaces to form an electrical interface 16. Elements 12a, 12b are brought into and out of mechanical contact by known means (not shown) to make or break electrical connection therebetween. The prior art materials of which contact elements 12a and 12b typically are formed are known to be susceptible to oxidation to form surface oxide layers 14a, 14b that are non-conductive.

Referring to FIGS. 2a and 2b, a blank 20 comprising an alloy in accordance with the invention has a free surface 22 available for oxidation to form a surface oxide layer 22' having a conductance of, preferably, less than about 0.0015 $\Omega cm^2$. When such alloys are substituted into apparatus 10 for forming elements 12a, 12b, the resulting surface oxide layers 14a, 14b are conductive. In electrical contacts in accordance with the invention, conductive oxide layers of the alloys may be formed in situ before or after assembly of the electrical contacts, or may be provided in an oxidative step during manufacture of a contact-containing electromechanical apparatus.

Materials exhibiting passivating conductive oxide layers, suitable for forming contact elements 12a, 12b and surface oxide layers 14a, 14b in accordance with the invention, are selected from the metal alloy group consisting of chemical elements having the following elemental symbols:

Y—Ba—Cu
La—Sr—Co
La—Sr—Cr
La—Sr—V
La—Ca—Mn
La—Sr—Mn
La—Nd—Ni
Ti—Ta
Ti—Nb
Ti—V
Ti—W
Ti—Mo
Ti—Zr—Ta
Ti—Zr—Nb
Cr—Ta
Cr—Nb
Cr—Ti
Cr—Zr
Sr—V
Ni—Li
Cu—Ti
Cu—Fe
Cu—Mn
Cu—Al
Cu—Si
Sn—Sb
Sn—In

To further illustrate the manufacture, composition, and benefit of alloys and oxides in accordance with the invention, the following discussion deals specifically with some alloys of the present invention having titanium (Ti) as the main metal component.

In nature, pure Ti forms a passivating $TiO_2$ layer when exposed to atmospheric oxygen which prevents further corrosion of the plate. Unfortunately, this layer acts as an electrical insulator and therefore limits current flow; however, it is known in the ceramics art that $TiO_2$ can be made conductive by doping with approximately 1 atom percent (at. %) tantalum (Ta) or niobium (Nb).

Figure 6:
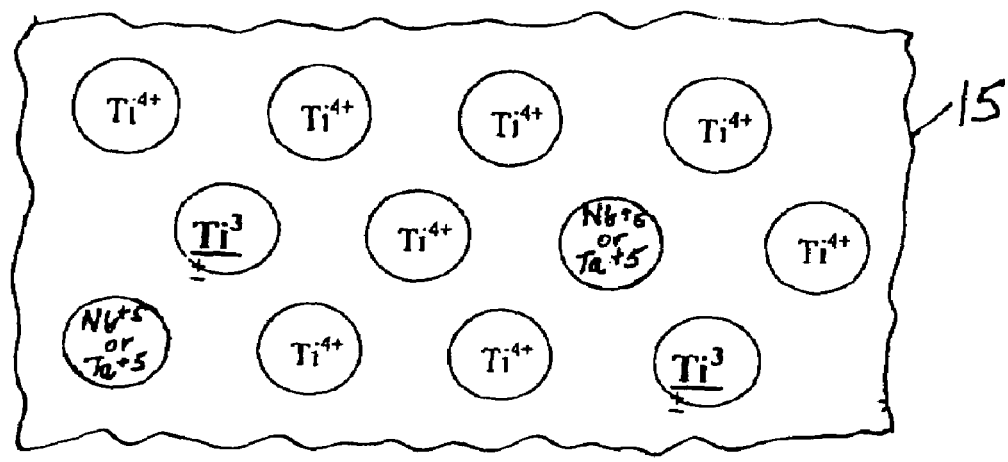
FIGS. 6 and 7 are schematic drawings of a lattice of metal ions in accordance with the invention, showing how the ionic valence states result in electrical conductivity.
Figure 7:
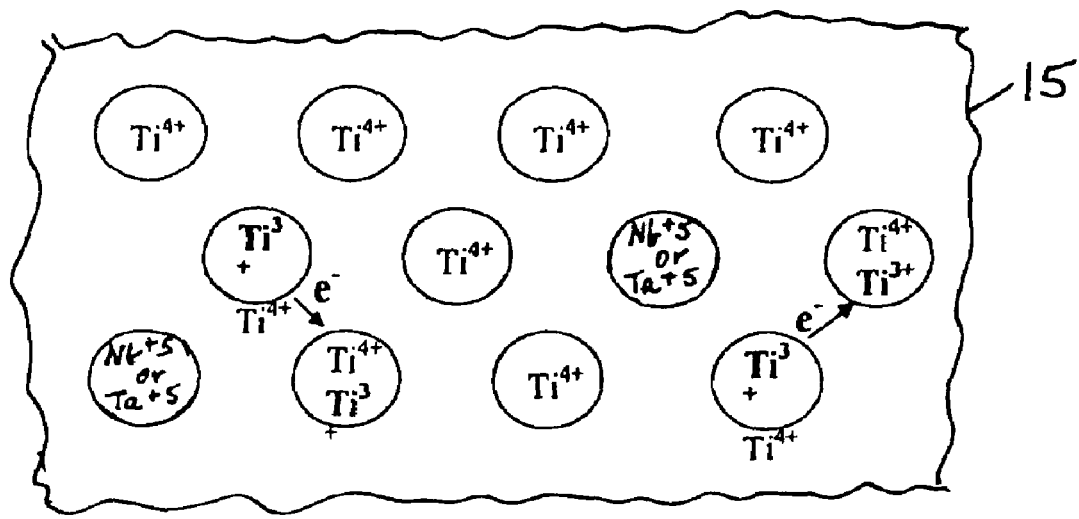

In the Ti example, for doping to be successful in producing metal alloys that can form oxides which are both passivating and conductive, it is believed that several conditions should be met:

1) To achieve n-type doping the doping ion should be in a higher valence state than the main metal ion, e.g, $Ti^{+4}$ may be doped by $Nb^{+5}$ or $Ta^{+5}$, as shown in alloy surface layer 15 in FIGS. 6 and 7. Thus, it is believed by the inventors, although not necessary to the validity of the claimed invention, that to preserve electroneutrality in the oxide, some of the $Ti^{+4}$ ions are forced into the $Ti^{+3}$ state. Electrons then hop between $Ti^{+3}$ and $Ti^{+4}$ ions, as shown in alloy surface layer 15 in FIG. 7, resulting in electrical conductivity. P-type doping can be achieved by adding dopants that can occur in oxidation state of (3+) or lower.

2) The main metal cations in the oxide lattice (e.g., $Ti^{+4}$) and the lower valence cations (e.g., $Ti^{+3}$) should have similar ionic radii, preferably within about 20%; otherwise, the smaller ions will tend to segregate as intersticial defects, which will ultimately interfere with the hopping conduction. Likewise, it is important that the doping ion truly substitute for the main ion and not segregate as an interstitial defect; therefore, the ionic radii of $Ti^{+4}$ and the dopant ion should be similar and preferably within about 20%, as shown below in Table I for Ti, Nb, and Ta.

3) The doping element should form a solid solution with the main element, rather than a compound, so that the doping atoms do not phase separate from the main metal atoms but remain uniformly distributed throughout the alloy. Phase diagrams of Ti—Nb and Ti—Ta indicate that alloys of Ti with about 0 to about 100 at. % of either Nb or Ta, preferably about 1 to 10 at. %, form such solid solutions. A schematic phase diagram typical for alloys of metals A and B in accordance with the invention is shown as FIG. 3.

Figure 4:
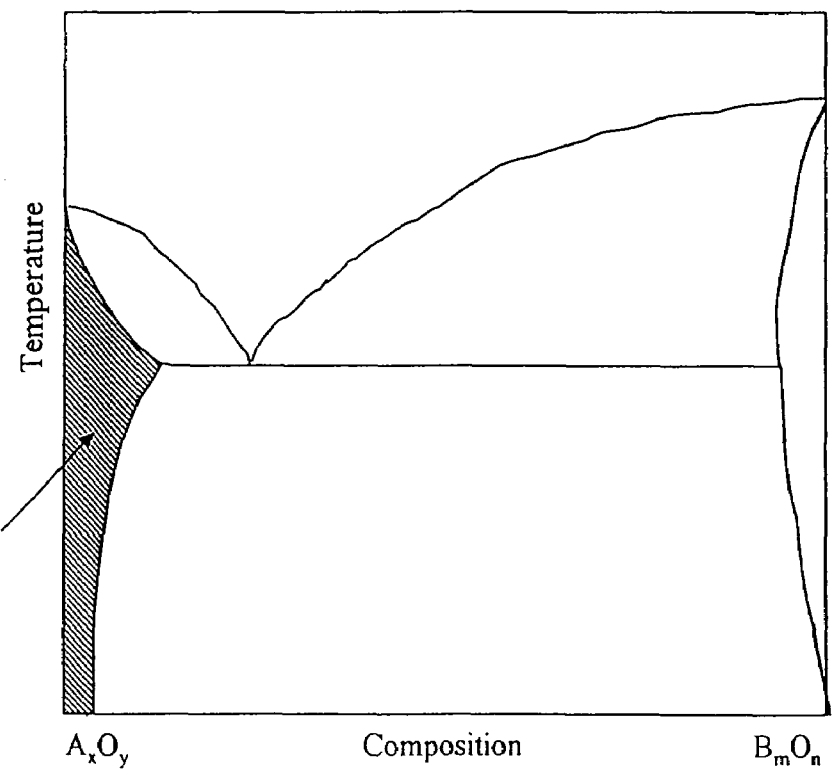
FIG. 4 is a schematic phase diagram of a binary metal oxide (although ternary and quaternary and higher order phase diagrams may equally apply) showing a region wherein a solid solution of metal oxides exists. (Note that FIG. 4 is a phase diagram for the oxides of metals A and B, whereas FIG. 3 is a phase diagram for the elemental metals A and B.)

4) The conductive passivating oxides to be formed should also form solid solutions without phase separation, which would result in formation of separate, highly non-conductive regions dominated by the properties of the single component oxides, which regions would be highly non-conductive. Phase diagrams, like the schematic metal oxide phase diagram shown in FIG. 4, indicate that both the $TiO_2$—$Nb_2O_5$ and $TiO_2$—$Ta_2O_5$ systems form solid solutions of metal oxides.

TABLE I

Ionic Radii of Titanium Ions and Exemplary Titanium Dopants

| Ion | Ionic Radius (Å) |
| --- | --- |
| $Ti^{+3}$ | 0.76 |
| $Ti^{+4}$ | 0.68 |
| $Nb^{+5}$ | 0.69 |
| $Ta^{+5}$ | 0.68 |

Alloys of either Nb and Ta meet all four of the above criteria when the dopant is added to Ti in the dopant range of about 1 at. % to about 50 at. %, preferably between about 1 and about 10 at. %.

In order to form a conductive passivating surface layer on an electrode formed of a Ti alloy, the surface atoms must be oxidized, preferably by controlled electro-oxidation. A currently preferred means for providing such oxidation is via cyclic voltammetry (CV), although obviously other oxidation methods as may occur to one of skill in the art are fully comprehended within the scope of the present invention. Since the composition of corrosive fluid which accumulates in a PEM fuel cell assembly is known, oxidation of an alloy in such a fluid can produce an oxide surface film which is both conductive and passivating to further oxidation by the fluid, thereby providing long-term service in such a fuel cell assembly.

One satisfactory CV oxidation method includes the steps of:

a) forming 1073 ml of an aqueous electrolyte solution containing 2 ml 490 ppm HF, 0.56 ml 980 ppm $H_2SO_4$, and 7 g $Na_2SO_4$ in deionized water;

b) mounting in the solution a working electrode formed of the alloy to be oxidized, a graphite counter-electrode, and a Calomel reference electrode;

c) heating the electrolyte solution to 80° C. for 15 minutes while bubbling oxygen through the solution and monitoring the open circuit potential (OCV) between the working electrode and the reference electrode; and d) ramping the potential from the OCP up to 1 volt and then down to 0, preferably at a scan rate of about 5 mV/sec.

Figure 8:
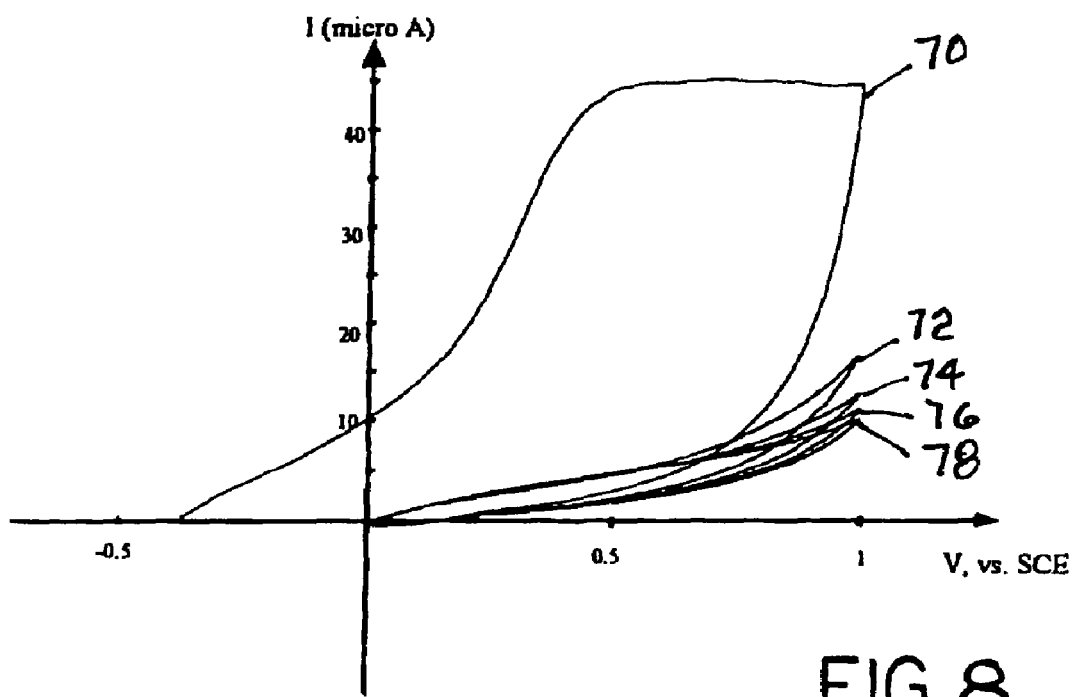
FIG. 8 is a line graph showing rapid formation of a passivating oxide layer by cyclic voltammetry.

Additional ramping cycles may be imposed; however, as shown in FIG. 8, a high current flow is obtained in the first cycle 70 but not in four subsequent cycles 72, 74, 76, 78, indicating that a passivating film is formed in the very first cycle 70. This film may have a thickness of about 100 Å. The electrical resistance of the passivating layer is about 80-100 times greater than that of the non-oxidized alloy, but as shown in Table II it is within the desired upper limit of 0.0015 $\Omega cm^2$.

TABLE II

Surface Resistance of Ti Alloy Oxides (5 CV Cycles)

| Percent Dopant | Surface Resistance ($\Omega cm^2$) |
| --- | --- |
| 1% Ta | 0.0001 |
| 3% Ta | 0.00025 |
| 1% Nb | 0.00081 |
| 1.5% Nb | 0.00008 |
| 3% Nb | 0.00015 |

Figure 5:
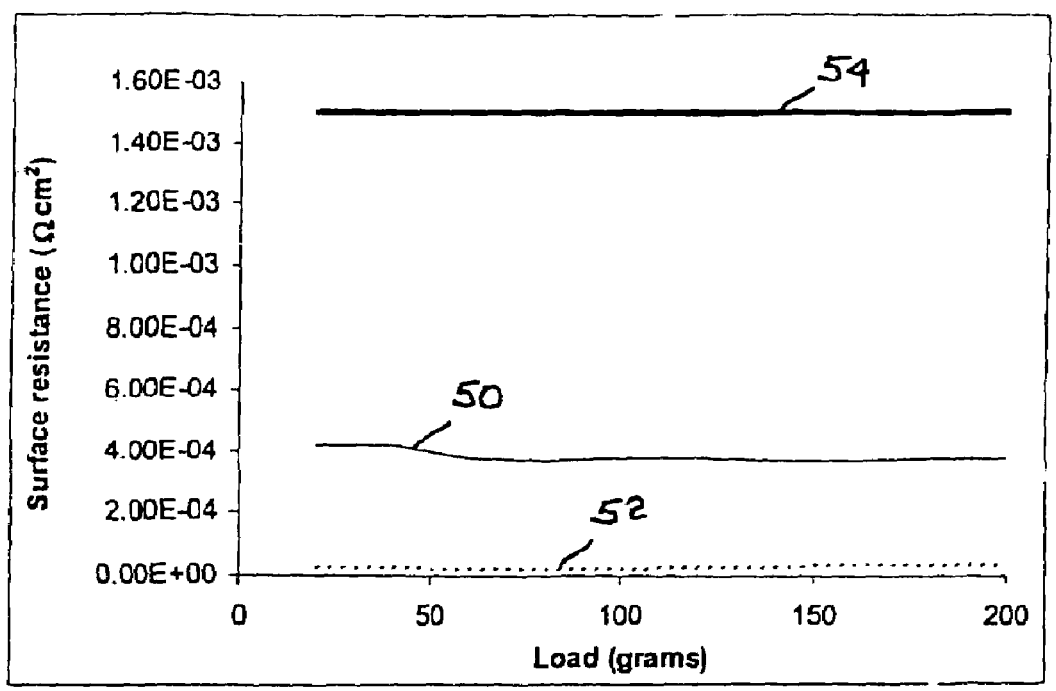
FIG. 5 is a graph of force versus contact resistance, showing the contact resistance of a metal alloy in accordance with the invention, before and after oxidation, as a function of force applied to a contact interface.

Working load can affect the stability and conductivity of electrical connections. FIG. 5 shows the effect of load to be negligible on a surface oxide layer (line 50) in accordance with the invention, as well as on the bare metal surface (line 52) from which was formed, and a prior art passivated metal surface (line 54).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Ni—Li, and combinations thereof, said metal alloy being capable of forming a surface metal oxide layer that is conductive.

2. The fuel cell in accordance with claim 1 wherein said fuel cell is a proton exchange membrane fuel cell.

3. The fuel cell in accordance with claim 1 wherein said fuel cell is a solid-oxide fuel cell.

4. The fuel cell in accordance with claim 1 wherein said electrical contact is an electrical terminal.

5. The fuel cell in accordance with claim 1 wherein said electrical contact is an interconnect for an electronic system.

6. The fuel cell in accordance with claim 1 wherein said electrical contact is entirely formed of said metal alloy.

7. The fuel cell in accordance with claim 1 wherein said electrical contact comprises:

a) a conductive core portion formed of base metal; and b) an outer portion formed of said metal alloy.

8. The fuel cell in accordance with claim 1 wherein said surface metal oxide layer exhibits an electrical surface resistance of no more than about 0.0015 $\Omega cm^2$.

9. The fuel cell in accordance with claim 1 wherein a first metal element is a main metal and an additional metal element is a dopant.

10. The fuel cell in accordance with claim 9 wherein said main metal is titanium and said dopant is selected from the group consisting of niobium and tantalum.

11. The fuel cell in accordance with claim 9 wherein said main metal is copper and said dopant is selected from the group consisting of aluminum, silicon, iron, manganese, vanadium, and titanium.

12. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Sr—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Sn—In, Ni—Li, and combinations thereof, said metal alloy being capable of forming a surface metal oxide layer that is conductive, wherein a first metal element is a main metal and an additional metal element is a dopant, and wherein said dopant is present in said alloy in a range between about 1 atom percent and about 50 atom percent.

13. The fuel cell in accordance with claim 12 wherein said dopant is present in said alloy between about 1 atom percent and about 5 atom percent.

14. The fuel cell in accordance with claim 13 wherein said dopant is present in said alloy in a range between about 1 atom percent and about 3 atom percent.

15. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Sr—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Sn—In, Ni—Li, and combinations thereof, said metal alloy being capable of forming a surface metal oxide layer that is conductive, wherein a first metal element is a main metal and an additional metal element is a dopant, and wherein said dopant has an atomic radius that differs from the atomic radius of said main metal atom by less than about twenty percent.

16. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Sr—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Sn—In, Ni—Li, and combinations thereof, said metal alloy being capable of forming a surface metal oxide layer that is conductive, wherein a first metal element is a main metal and an additional metal element is a dopant, and wherein a cation of said dopant has a radius that differs from the radius of a cation of said main metal by less than about ten percent.

17. The fuel cell in accordance with claim 16 wherein said dopant cation is in a higher valence state than said main metal cation.

18. The fuel cell in accordance with claim 16 wherein said dopant cation is in a lower valence state than said main metal cation.

19. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Sr—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Sn—In, Ni—Li, and combinations thereof, said metal alloy being capable of forming a surface metal oxide layer that is conductive, wherein a first metal element is a main metal and an additional metal element is a dopant, and wherein said dopant and said main metal are present as an atomic solid solution.

20. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Sr—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Sn—In, Ni—Li, and combinations thereof, said metal alloy being capable of forming a surface metal oxide layer that is conductive, wherein a first metal element is a main metal and an additional metal element is a dopant, and wherein oxides formed from said main metal and said dopant form a solid solution with one another.

21. A fuel cell comprising an electrical contact that includes a metal alloy containing at least two metal elements, wherein said metal alloy is selected from the group consisting of Y—Ba—Cu, La—Sr—Co, La—Sr—Cr, La—Sr—V, La—Ca—Mn, La—Nd—Ni, Ti—Ta, Ti—Nb, Ti—V, Ti—W, Ti—Mo, Ti—Zr—Ta, Ti—Zr—Nb, Cr—Ta, Cr—Nb, Cr—Ti, Cr—Zr, Sr—V, Cu—Ti, Cu—Fe, Cu—Mn, Cu—Al, Cu—Si, Sn—Sb, Ni—Li, and combinations thereof, said metal alloy being capable of forming a surface metal oxide layer that is conductive, wherein said fuel cell is a solid-oxide fuel cell.

\* \* \* \* \*